United States Patent [19]

Croslin

[11] Patent Number: 6,018,576
[45] Date of Patent: *Jan. 25, 2000

[54] METHOD AND APPARATUS FOR AUTOMATED NODE-BASED NORMALIZATION AFTER NETWORK RESTORATION

[75] Inventor: William D. Croslin, Colorado Springs, Colo.

[73] Assignee: MCI Communications Corporation, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 08/775,222

[22] Filed: Dec. 31, 1996

[51] Int. Cl.⁷ .................................................. H04M 3/08
[52] U.S. Cl. .......................... 379/221; 379/26; 379/229; 370/217; 370/244
[58] Field of Search .................................. 379/219, 220, 379/221, 26, 33, 207, 229; 370/216, 217, 218, 219, 241, 242, 243, 244

[56] References Cited

U.S. PATENT DOCUMENTS

| | | | |
|---|---|---|---|
| 5,146,452 | 9/1992 | Pekarske | 379/221 |
| 5,170,393 | 12/1992 | Peterson et al. | 370/255 |
| 5,182,744 | 1/1993 | Askew et al. | |
| 5,187,740 | 2/1993 | Swaim et al. | 379/209 |
| 5,233,600 | 8/1993 | Pekarske | |
| 5,241,533 | 8/1993 | Kimoto et al. | 370/243 |
| 5,335,268 | 8/1994 | Kelly, Jr. et al. | 379/112 |
| 5,353,339 | 10/1994 | Scobee | 379/221 |
| 5,357,563 | 10/1994 | Hamilton et al. | 379/221 |
| 5,367,562 | 11/1994 | Tourbah et al. | 379/26 |
| 5,459,716 | 10/1995 | Fahim et al. | 370/16 |
| 5,463,615 | 10/1995 | Steinhorn | 379/221 |
| 5,465,294 | 11/1995 | Chapman, Jr. et al. | 379/221 |
| 5,636,203 | 6/1997 | Shah | 370/244 |
| 5,646,936 | 7/1997 | Shah et al. | 370/228 |
| 5,687,212 | 11/1997 | Kinser, Jr. et al. | 379/33 |

FOREIGN PATENT DOCUMENTS

| | | |
|---|---|---|
| 08186602 | 7/1996 | Japan . |
| 9701230 | 1/1997 | WIPO . |

OTHER PUBLICATIONS

Chao C.W: Fastar—A Robust System for Fast DS3 Restoration, vol. 2, Dec., 1991.

Manione et al. "An Inconsistencies Tolerant Approach in the Fault Diagnosis of Telecommunications Networks" Feb. 14, 1994.

Bouloutas, et al. "Alarm Correlation and Fault Identification in Communication Networks" Feb. 1, 1994.

*Primary Examiner*—Scott Wolinsky

[57] ABSTRACT

An automated and distributed method and apparatus for normalizing a network after restoration begins with end nodes of the restoral route detecting a clearing of alarms after a failure is repaired. After a specified time period is passed, the end nodes perform a sequence of tasks to execute a modified form of a patch-and-roll normalization. Each end node transmits traffic over both the restoral route and the original traffic route that has been fixed. Each end node confirms receipt of signals over the fixed traffic route. Thereafter, each end node switches to receiving live traffic from the restoral route to the fixed traffic route and stops transmitting over the restoral route. Finally, the end nodes instruct the other nodes along the restoral route to disconnect the restoral route.

29 Claims, 3 Drawing Sheets

METHOD AND APPARATUS FOR AUTOMATED NODE-BASED NORMALIZATION AFTER NETWORK RESTORATION

TECHNICAL FIELD

The present invention relates to communication systems, including network normalization following restoration of a network.

BACKGROUND OF THE INVENTION

Telecommunications and other network providers continually strive to increase the traffic carrying capability of their transmission medium. As a result, greater bandwidth media, such as fiber optic cables, are increasingly employed. Unfortunately, if one or more of the fiber optic cables fail, massive disruption of services to a large number of network customers and users can result. Network service providers or telecommunications carriers therefore strive to quickly and economically restore traffic effected by these disruptions or "outages." Restoring network outages generally requires four steps: (1) detecting the network failure, (2) isolating the location of the failure in the network, (3) determining a traffic restoral route, and (4) implementing the restoral route. Network restoration must be executed quickly to ensure minimal interruption of network traffic. Therefore, nearly all telecommunications carriers wish to restore traffic within a few seconds or less.

Telecommunications carriers typically simulate possible failures, determine restoral routes and develop a "pre-plan" by collecting large amounts of data reflecting the logical topology of the network, and then analyze this data. The collected data is often retrieved from network engineering databases which reflect the logical construction of the network, such as indicating the connections and paths of all network traffic trunks. An engineer or network analyst analyzes the collected data, compares the collected data to the geographic or physical layout location of the network, and then generates the pre-plans therefrom.

Since the number of possible failures in a network necessarily increases as the size of the network increases, a large number of pre-plans are required. Furthermore, as a network grows, pre-fabricated restoral plans or pre-plans must be continually reevaluated, and new pre-plans created. To overcome the lack of updated data in pre-plan restoration methods, dynamic restoration methods have been developed. Dynamic restoration methods formulate a restoral route dynamically, during the restoration process and when a failure is detected, so that the method employs the most accurate and recent network data available.

Under either restoration method, the restoration route is typically established by interconnecting a number of spare links through different nodes of the network so that traffic may be rerouted through those spare links. These spare links may be referred to as spare capacity and they are purposely added to the telecommunications network for restoration. For economic considerations, this spare capacity is limited. Thus, if after restoration, the network were to remain in the topology with the previously spare links now carrying traffic, the network may less effectively restore traffic due to other failures. In other words, the spare capacity provides a safety margin for restoration. Yet once the spare capacity or some portion of it has been used, the safety margin could be severely diminished unless the topology of the network is restored to its normal state, i.e., prior to the failure.

Currently, once a fiber is repaired following an outage, technicians manually reconnect the different working and spare links at each cross-connect switch of the telecommunications network. The technicians refer to the pre-plan and follow instructions therein to connect/disconnect various ports at each of the cross-connect switches affected by the malfunctioned fiber to return the switch to its pre-failure state. This process is quite laborious and is subject to operator mistakes, and requires a substantial amount of repair time.

Under an alternative method of normalizing the network following restoration, a centralized system or computer employs a patch-and-roll method. Under the patch-and-roll method, the two end nodes of the restoral route transmit signals to each other over both restoral route and over the now fixed original traffic route. Each of the end nodes confirms transmission of the signals over the fixed traffic route, and thereafter, each end node switches to receive signals from their restoral route to the fixed traffic route. Each end node then stops transmitting over the restoral route. The centralized system, such as an operations support systems network (OSSN), performs the various tasks and issues commands to the end nodes. The OSSN, however, necessarily requires time to perform the patch-and-roll method and issue the appropriate commands to the end nodes. Additionally, if the commands are transmitted over spare trunks in the network, these trunks can then not be used for transmitting other traffic.

SUMMARY OF THE INVENTION

The present invention enhances network restoration processes by providing an automated or dynamic method of normalizing or returning a restored network to its normal or pre-restoration configuration. Under an exemplary embodiment of the present invention, end nodes of a restoral route detect the clearing of alarms (or the absence of alarms) following a failure. After a specified time period is passed, the end nodes preferably perform a strategic sequence of tasks to execute a patch-and-roll function. Each end node preferably transmits certain signals over both the restoral route and the original traffic route that is now fixed. Each end node confirms receipt of the signals over the fixed traffic route. Each end node then switches from receiving live traffic from the restoral route to the fixed traffic route, and stops transmitting over the restoral route. Thereafter, the end nodes instruct other nodes along the restoral route to disconnect the restoral route. The present invention is preferably an automated method of normalizing a network as a distributed process, as opposed to a centralized process, where various tasks are distributed and performed at different nodes in the network. Each of such nodes in the exemplary embodiment includes telecommunications devices employed for restoration, such as digital cross-connect systems.

The present invention embodies a method for normalizing a network following repair of a failure previously affecting an original communication route. The network has a plurality of nodes interconnected by links. The method includes the steps of: (a) initiating network normalization at a selected node in the network after determining that the failure has been repaired, the selected node being positioned along at least the original communication route or along a restoration route in the network; (b) receiving signals over both the original and restoration routes; and (c) disconnecting the restoration route in response to receiving signals over both of the original and restoration routes.

DETAILED DESCRIPTION OF THE INVENTION

A telecommunications network, and in particular, a method and apparatus for analyzing and configuring the network, is described in detail herein. In the following description, numerous specific details are set forth such as network configurations, ordering and execution of steps under an analysis and normalization routine, etc., in order to provide a thorough understanding of the present invention. One skilled in the relevant art, however, will readily recognize that the present invention can be practiced without use of the specific details described herein, or with other specific steps in a routine, etc. Well-known structures and steps are not shown or described in detail in order to avoid obscuring the present invention.

Figure 1:
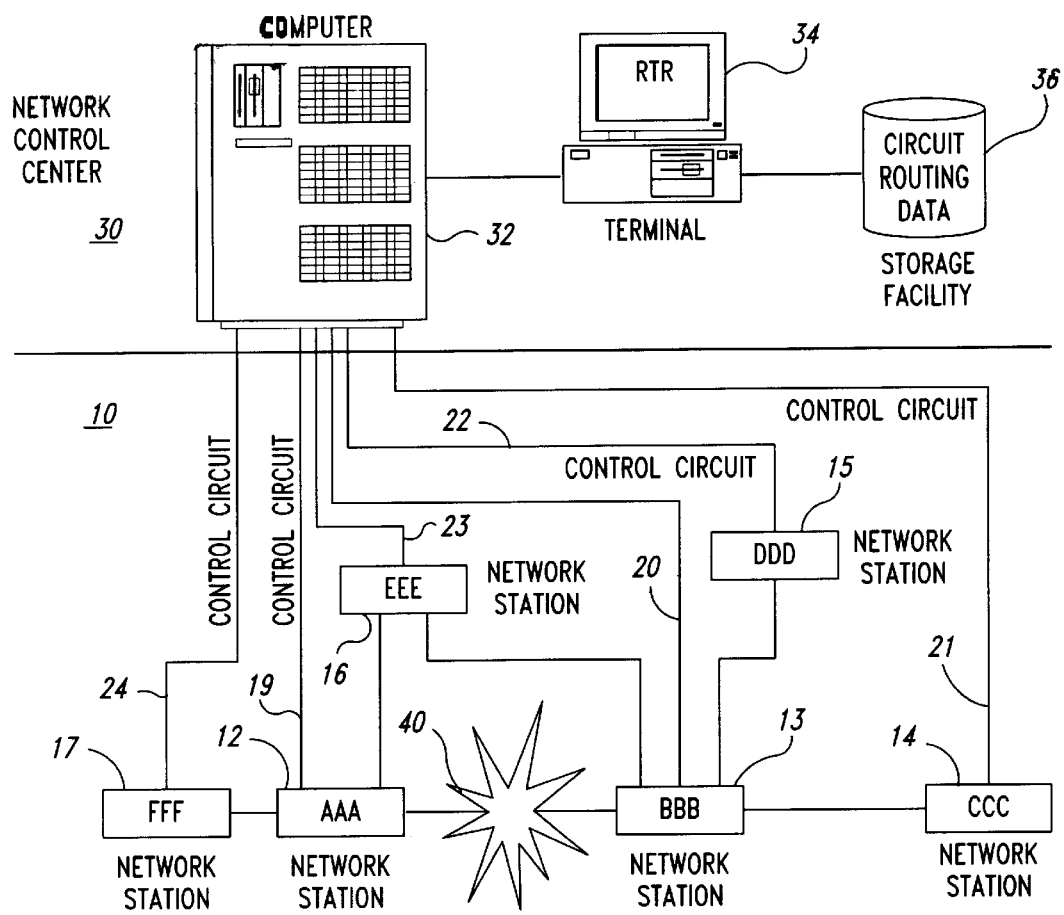
FIG. 1 is a block diagram of a portion of a network, including a network control center.

Referring to FIG. 1, a simplified telecommunication system is shown to help understand the present invention. As shown in FIG. 1, a telecommunications network 10 includes interconnected network stations or nodes AAA, BBB, CCC, DDD, EEE, and FFF, designated as stations 12–17, respectively. A "node" as used generally herein, refers to a site of a physical link in a network, representing a terminal or system which may serve any of a number of functions. For example, each node can include digital cross connect (DXC) systems, multiplexing equipment, line termination equipment, and/or fiber transmission systems. A DXC system is a complex digital switch capable of automatically switching trunks based on external commands. A "trunk," as generally used herein, is a logical channel of communications capacity that traverses one or more nodes and one or more links between nodes (e.g., DS-0, DS-1, DS-3, etc.). Line termination equipment and fiber transmission systems typically include light-to-electricity transducers and/or multiplexers, as is known in the art.

Under normal conditions, communications traffic is routed between the network nodes 12–17 along trunks, and between these and other network nodes of the larger network 10 of which the portion shown in FIG. 1 forms a part thereof. Each node typically has a unique address or other designator in the network 10. In addition, each node 12–17 is connected by control circuits 19–24, respectively, to a network management or control center 30. The control circuits 19–24 may each be an X.25 circuit, which is a known circuit for carrying control communications between the associated node and the network control center 30.

The network control center 30 includes a computer 32 and a terminal 34 for interacting with the computer 32 which provides an interface for human interaction. The network control center 30 also includes a storage facility or device 36 for storing network and circuit routing data, topology data, pre-plans, etc. Several of such network control centers 30 can be distributed throughout the network 10.

When an outage or disruption of telecommunications traffic occurs, such as a failure 40, the nodes 12–17 that couple to trunks or circuits impacted by the disruption recognize the disruption. In response to the recognized disruption, two or more of the nodes 12–17 generate alarms that are sent over the control circuits 19–24 to the network control system 30. From these alarms, the network control system 30 or the nodes themselves determine the location of the outage. Under the centralized restoration system of FIG. 1, the network control system 30 performs failure locating routines, such as routines described in detail in the inventor's copending U.S. patent application Ser. No. 08/775,220 entitled "Centralized Restoration of a Network Using Preferred Routing Tables To Dynamically Build an Available Preferred Restoral Route," filed on Dec. 31, 1996. Alternatively, the network 10 can employ a distributed dynamic restoration method such as that described in the inventor's copending U.S. patent application Ser. No. 08/774,599 entitled "Method and System of Distributed Network Restoration Using Preferred Routes," filed on Dec. 30, 1996. A combined centralized and distributed restoration method can also be employed such as the inventor's copending U.S. patent application Ser. No. 08/775,221 entitled "Integration of a Centralized Network Restoration System With a Distributed Network Restoration System," filed on Dec. 31, 1996.

Under appropriate routines, such as those in the above copending applications, the computer 32 in a centralized restoration system retrieves from the storage facility 36 information about the impacted circuits including the paths that they follow and the equipment they pass through at different nodes along the paths. Based on this data, the network control system 30 can dynamically restore telecommunications traffic on the network despite the outage. Alternatively, the network control system 30 can employ a pre-plan previously determined and stored in the storage facility 36.

The network control center 30 implements the alternative or restoral routes in the network 10 by establishing new connections via commands transmitted through the control circuits 19–24, or alternatively, depending upon the equipment employed at the nodes 12–17, by other means of transmission to effect or direct manual actions to be taken at the nodes. For example, spare high bandwidth DS-3 trunks typically exist throughout the network 10, which can be employed to restore an outage in the network. The network 10 is most effectively restored and then normalized when the nodes 12–17 employ DXC systems that can automatically switch from one trunk to another based on commands from the network control center 30.

Figure 2:
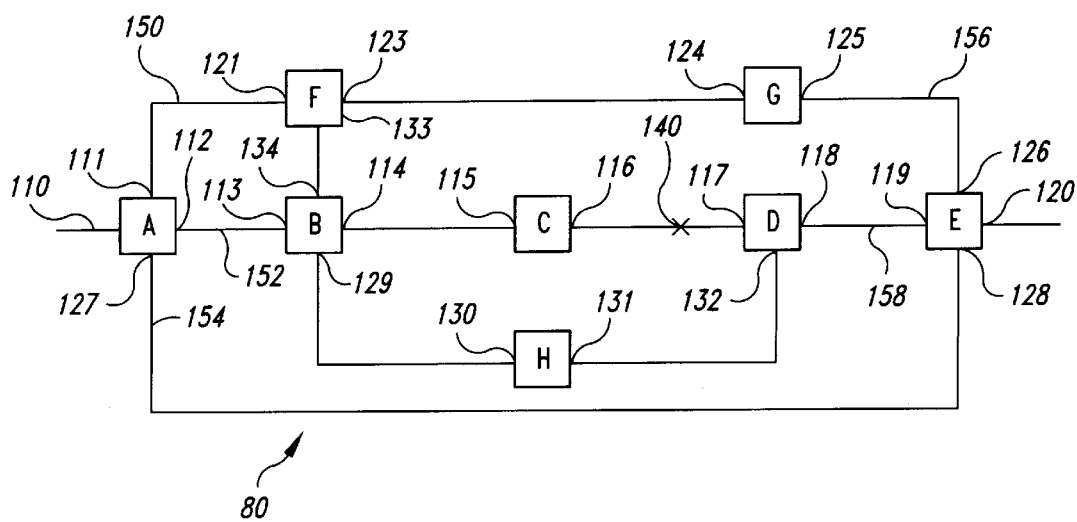
FIG. 2 is a block diagram of an alternative portion of the network.

Referring to FIG. 2, an exemplary network portion 80 of the network 10 is shown as having nodes designated as nodes A, B, C, D, E, F, G, and H. The nodes A–H are coupled by links as shown in FIG. 2. A "link," as generally used herein, is a physical connection between two nodes, representing any type and any capacity of communications between the nodes. A single link usually consists of multiple trunks, and a single trunk consists of one or more links that span multiple nodes. In general most high capacity networks contain far more trunks than links.

The network portion 80 of FIG. 2 is employed below as an example of a network portion analyzed and normalized under the exemplary embodiment of the present invention. The nodes A–H represent "restoration" nodes of the telecommunications network 10. While the network 10 typically includes various nodes, such as nodes having multiplexing equipment (e.g., "M13 nodes"), digital repeater nodes, switch nodes, etc., only certain nodes in the network are employed for network restoration. For example, nodes having DXC systems are especially useful for network restoration. Thus, nodes having DXC systems in the exemplary embodiment are restoration nodes. Each restoration node, such as the nodes A–H of FIG. 2, each preferably includes a computer or other data processor. The processor performs the exemplary normalization routine, described below.

Other nodes that are not useful for restoration, such as nodes containing only digital repeater equipment, are "intervening nodes," and are not shown in FIG. 2.

Each node A–H is coupled to the links shown in FIG. 2 by way of ports at the nodes. For example, ports 111, 112 and 127 of node A couple to nodes F, B and E through links 150, 152, 154, respectively. Similarly, ports 126, 119 and 128 of node E couple to nodes G, D and A through links 156, 158 and 154, respectively. Other ports 110, 113–126 and 128–134 are shown in FIG. 2. Each of the ports in FIG. 2 support traffic trunks, where each port transmits and receives traffic for one trunk (e.g., a DS-3 level trunk). While there are typically multiple trunks, and therefore multiple ports, on each inter-node link in the network 10, only one trunk per link is shown in FIG. 2 for illustrative purposes.

A hypothetical failure 140 previously occurred between nodes C and D. A restoration process (either centralized or distributed) previously restored traffic for an original communication or traffic trunk or route spanning nodes A-B-C-D-E, with a restoration or restoral route that traverses nodes A-B-F-G-E. Thus, as shown in FIG. 2, nodes B and E represent the end nodes of the restoral route. In other words, the end nodes in the exemplary embodiment correspond to nodes positioned at opposite ends of both an original span and a restoral span, the original and restoral spans forming part of the original traffic and restoral routes. The port 114 on node B and the port 119 on node E, each of which previously supported the original traffic route, are now unconnected or "open-ended."

Sometime after the restoral route A-B-F-G-E was established to compensate for the failure 140, the failure is repaired or fixed. After repairing the failure 140, the network 10 becomes aware of the repair. Thereafter, the network 10 normalizes itself or restores the original traffic route under the present invention.

Figure 3A:
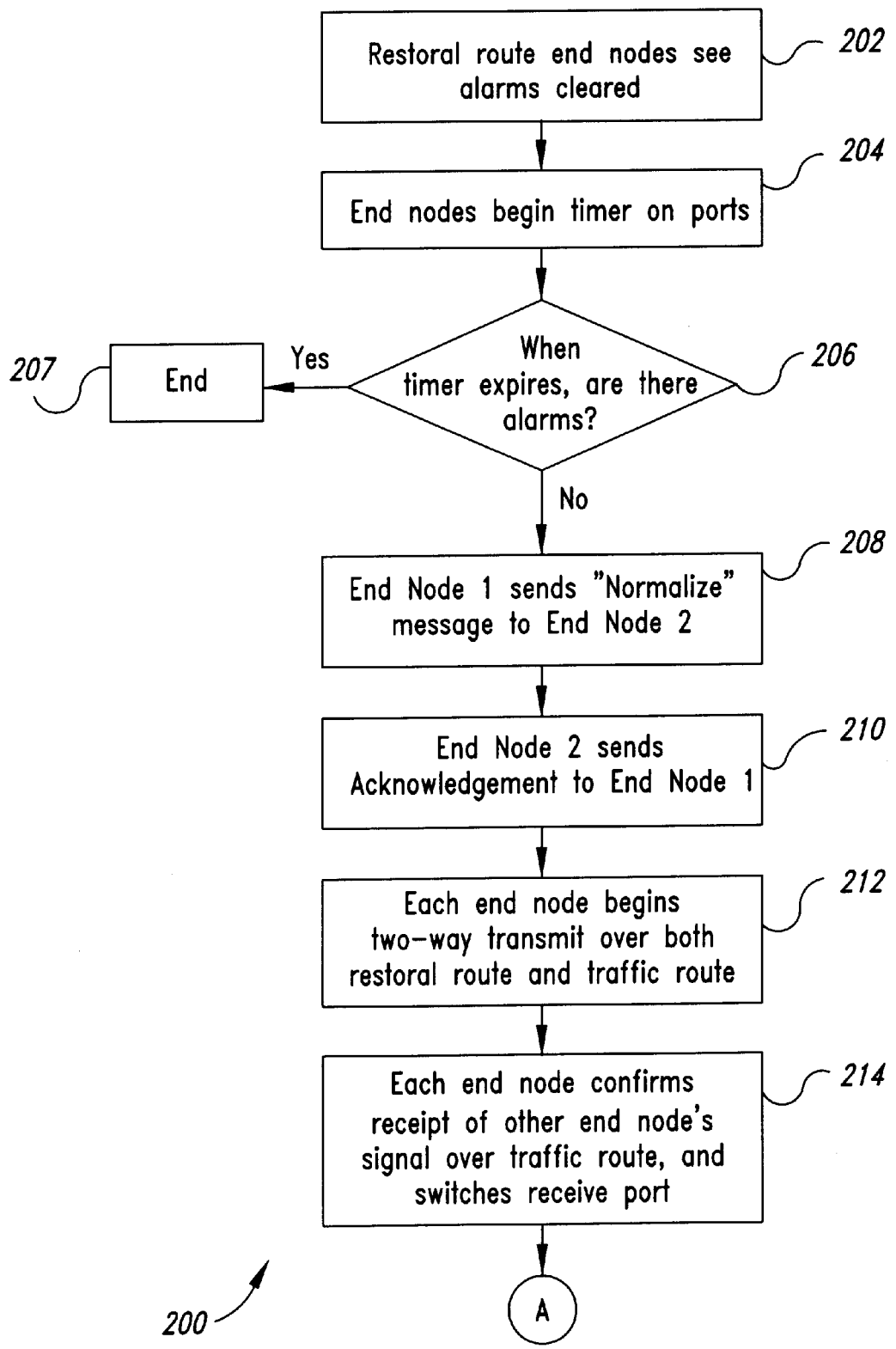
FIGS. 3A and 3B together form an exemplary flowchart diagram of a method for normalizing the network following restoration under the present invention.
Figure 3B:
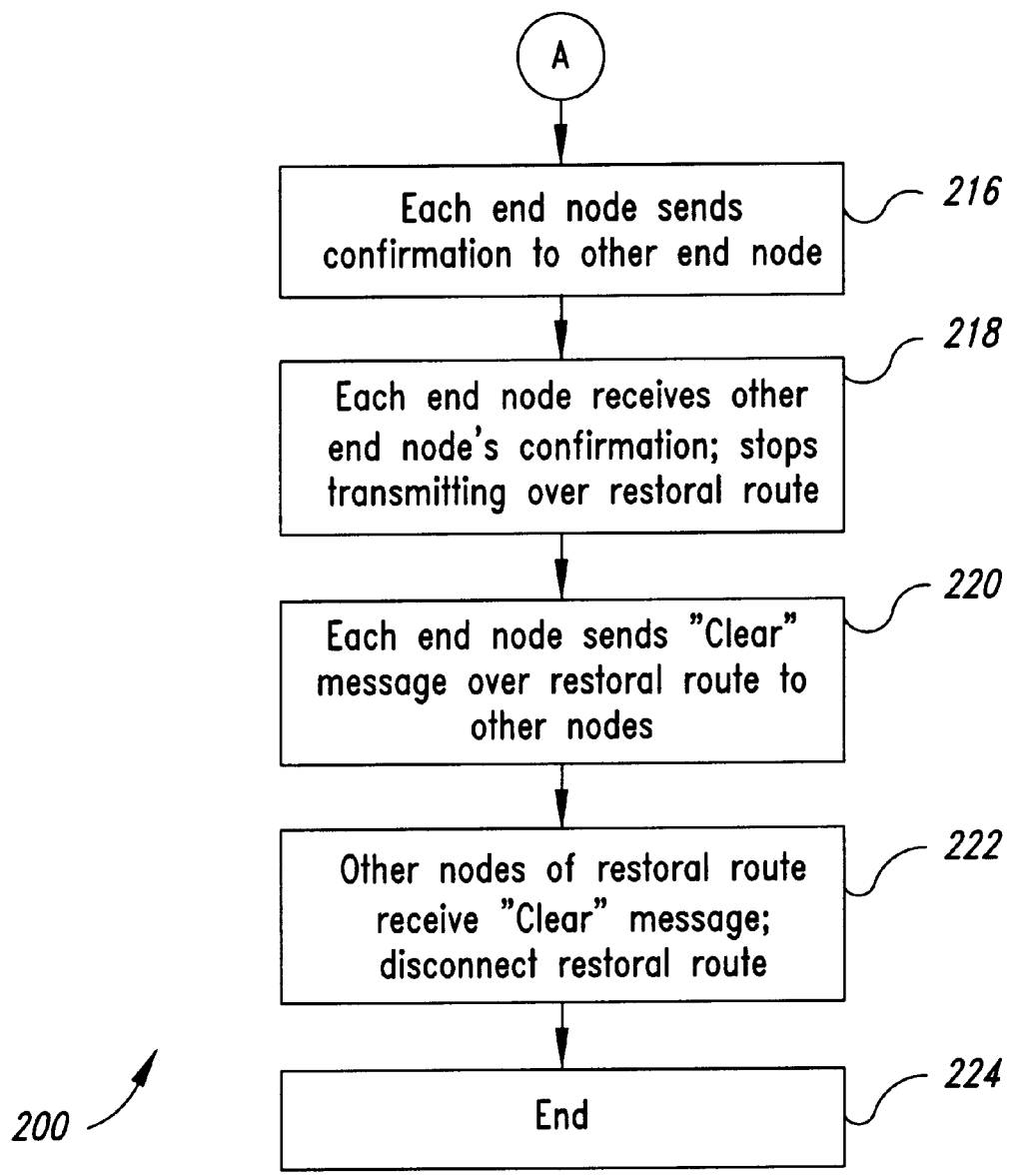

Referring to FIGS. 3A and 3B, a routine 200 is shown which is performed by the network 10, in particular, by the processor of each restoration node. The routine 200 can be performed on a single processor or computer of virtually any type, preferably a computer which forms part of each restoration node. Beginning in step 202, each end node of the restoral route determines that the previous failure has been repaired. For example, the end nodes B and E determine that the failure 140 has been repaired by recognizing that alarms are no longer being received from other nodes in the network 10, namely, the nodes C and D. When the failure 140 is repaired, the end nodes B and E no longer recognize or see alarms on the ports 114 and 119, respectively.

In step 204, each end node of the restoral route initiates a timer at their corresponding ports as soon as the end nodes recognize that the alarms have cleared. The end nodes employ a timer to ensure that the failure has been actually fixed, rather than being momentarily interrupted. In the exemplary embodiment, the timer is set at a period of 10–15 minutes and counts down to zero therefrom.

In step 206, each end node determines if the alarms are being received on their corresponding ports after the timer expires. If any alarms exist on the ports, then in step 207, the routine 200 ends, indicating that the failure still exists in the network 10. However, if the alarms are still absent, then in step 208, one of the end nodes (End Node 1) transmits a normalized command message to the other end node (End Node 2). The designation of the end nodes as End Node 1 and End Node 2 is arbitrary, and in the above example, node B is End Node 1 and node E is End Node 2. The designation between end nodes is preferably preselected before a failure affects the network 10 or is otherwise determined, so that for any given pair of end nodes in the network, only one node will be designated as End Node 1. The normalized command message received by End Node 2 (node E) commands End Node 2 to initiate the below-described normalization process.

The normalization command message, as well as other messages described herein, are sent via known transmission media using one of various known methods, such as over existing traffic trunks in the network 10 (particularly if a distributed restoration method is employed by the network) or over supplemental communication lines coupled between each node through the network control system 30 (if a centralized restoration method is employed). Alternatively, the normalization command message (and other messages) are transmitted over a separate wide area network (WAN). The messages can be transmitted over an existing band or on an outside band of the traffic trunks, network control system communications lines, WAN communications lines, etc.

In step 210, the End Node 2 (node E) returns an acknowledgment message back to End Node 1 over the same transmission medium. When End Node 2 transmits the acknowledgment message, and End Node 1 receives the message, the normalization process is fully initiated, and confirmed by both end nodes. As a result, the normalization and acknowledgment messages can be considered initiation messages that initiate normalization between the two end nodes.

In step 212, each end node begins transmitting traffic over both the restoration route and the fixed traffic route. In the above example, node B continues to transmit to node E over the port 134 (which represents the restoral route), and also begins to transmit traffic over the port 114 (which represents the original, fixed traffic route). Likewise, node E continues to transmit to node B over the port 126 (the restoral route), and also begins to transmit over the port 119 (the fixed traffic route). During step 212, each end node is transmitting traffic over both the restoral route and the fixed traffic route, but is receiving live traffic over only the restoral route. Therefore, the nodes B and E receive traffic on only the ports 134 and 126.

In step 214, each end node confirms that it receives live traffic at both the port for the restoral route and the port for the fixed traffic route. Thereafter, the nodes switch to receiving live traffic from the port for the restoral route to the port for the original, fixed traffic route. In the above example, node B first confirms that it receives node E's traffic signal over the port 114. Then node B switches to receiving live traffic from the port 134 to the port 114. Likewise, node E first confirms that it receives node B's traffic signal over the port 119. Thereafter, node E switches to receiving live traffic from the port 126 to the port 119.

In the exemplary embodiment, the end nodes simply confirm that they each receive traffic over both of the restoral and original traffic ports. In an alternative embodiment, the end nodes correlate their traffic signals on the two ports to confirm that substantially similar traffic signals are received on both ports. In yet another alternative embodiment, the end nodes exchange selected signals therebetween over both the original, fixed traffic route and the restoral route, rather than, or in addition to, the live traffic signals, to confirm proper operation of the original, fixed traffic route.

In step 216 (FIG. 3B), each end node transmits a confirmation message to the other end node. The confirmation message indicates to the other end node that it has received the live traffic on the original, fixed traffic route and successfully switched to this route. For example, node B transmits the confirmation message to node E indicating that node B successfully received traffic at the port 114 and switched to receiving traffic on this port, as opposed to the port 134. Similarly, node E transmits the confirmation message to node B indicating that node E successfully received traffic at the port 119 and switched to receiving traffic on this port, as opposed to the port 126.

In step 218, each end node receives the confirmation message transmitted by the other end node. This confirmation message represents confirmation in the network 10 that the other end node has switched to receiving live traffic from the restoral route to the fixed traffic route. As a result, when each of the other end nodes receives the confirmation message, it stops transmitting the live traffic signal over the restoral route. The confirmation message ensures that both of the end nodes receive the live traffic over the original, fixed traffic route so that at no time is traffic disrupted in the network 10. As a result, at the conclusion of step 218, each end node no longer transmits traffic over the restoral route and only transmits and receives live traffic over the original, fixed traffic route. In the above example, node E receives the confirmation message from node B. In response thereto, node E discontinues transmitting the live traffic signal from the port 126 over the restoral route. Node B similarly discontinues transmitting the live traffic over the port 134 on the restoral route in response to the confirmation message it receives from node E.

In step 220, each end node transmits a clear command message over the restoral route to the other nodes along the restoral route. The clear command message instructs the nodes along the restoral route to disconnect the previously established restoral route. In the above example, nodes B and E both transmit the clear command message from ports 134 and 126, respectively.

In step 222, the other nodes along the restoral route receive the clear command message from one or both of the end nodes. In response thereto, these other nodes disconnect the restoral route by disconnecting their ports which were enabled to form part of the restoral route. In the above example, nodes F and G receive the clear command message at the ports 133 and 125. In response thereto, node F disconnects ports 123 and 133, while node G disconnects ports 124 and 125.

Following step 222, live traffic is again transmitted and received over the original fixed traffic route A-B-C-D-E; live traffic is no longer transmitted over the restoral route. In other words, the network 10 has been normalized to the state in which it existed prior to the failure 140. As a result, a routine 200 ends in step 224.

If either of the end nodes fails to complete any of the steps in the routine 200, then the routine ends. Thereafter, the routine 200 is initiated again, beginning with step 202. For example, if node B receives node E's confirmation message, but node E fails to receive node B's confirmation message under step 218, node E continues to wait for a preselected time period in the event that node B's confirmation message is delayed. However, after the preselected time period, if node E still fails to receive node B's confirmation message, node E provides a reset command over the port 119, and reinitiates the routine 200 at step 202. In response thereto, node B again initiates the routine 200 in step 202.

The routine 200 forms a distributed normalization process where various tasks are performed by different components of the network, rather than by the central network system 30. As a result, the various tasks required to normalize the network 10 following the failure 140 are distributed to the various processors located at the nodes in the network, such as the nodes B, E, F, and G. Each of the nodes in the network preferably includes not only a processor, but a fixed storage device for storing the routine 200 at each node. Each node includes appropriate logical instructions, similar to the routine 200. If a given node in the network 10 becomes an end node for a restoral route, such as the nodes B and E, then these end nodes perform all of the steps of the routine 200, except step 222. The nodes along the restoral route perform step 222 in response to the clear message. Additionally, one of the end nodes performs step 208, while the other performs step 210, as explained above.

Importantly, the present invention can be applied to various types of restoration methods, including distributed and centralized restoration methods. The automated, distributed normalization method under the present invention can provide for quicker and more efficient normalization as opposed to centralized normalization techniques. Prior centralized normalization techniques first formulate the commands needed to perform a patch-and-roll normalization, and then issue the commands in the specific order. Each of the nodes then must transmit messages to the centralized system during the patch-and-roll process to inform the centralized system of the status of the normalization process. Under the above-described exemplary embodiment of the present invention, any centralized system, if employed, is free to perform other tasks. The nodes in the exemplary embodiment each perform aspects of a patch-and-roll type of normalization routine.

The granularity of the analysis and normalization performed under the routine 200 can vary. For example, the present invention has generally been described above with high bandwidth DS-3 trunks between restoration nodes having DXC equipment. However, the granularity of the analysis and normalization performed under the routine 200 can be increased so as to analyze and normalize lower bandwidth links, having, e.g., DS-1 trunks, and other nodes to thereby normalize all links and trunks in the network 10 following their restoration.

Although specific embodiments of, and examples for, the present invention are described herein for illustrative purposes, various equivalent modifications can be made without departing from the spirit and scope of the invention, as will be recognized by those skilled in the relevant art. While the exemplary embodiments described herein exchange signals and messages between two end nodes to ensure network integrity, the exemplary routine 100 can be readily modified to be performed at only one end node in the network, thereby allowing only one node to normalize the network. The teachings provided herein of the present invention can be applied to other communications or network systems, not necessarily the exemplary telecommunications systems described above. For example, while the present invention as been generally described above as being employed in the telecommunications network 10, the present invention is equally applicable to other communication systems, such as a network of computers.

While certain operations under the present invention have been described as occurring generally in a serial fashion, those skilled in the relevant art will recognize that it is entirely within the scope of the invention to conduct some operations more or less simultaneously, or even in reverse order, from that described herein. Additionally, the present invention can be modified to include or employ the systems and concepts of the inventor's copending applications or patents noted above, all of which are incorporated by reference herein.

These and other changes can be made to the invention in light of the above detailed description. In general, in the following claims, the terms used should not be construed to limit the invention to the specific embodiments disclosed in the specification and the claims, but should be construed to include any network analysis and normalization system that operates under the claims to normalize a network after repairing a failure. Accordingly, the invention is not limited by the disclosure, but instead its scope is to be determined entirely by the following claims.

I claim:

1. In a telecommunication network having a plurality of nodes interconnected by links, a method for normalizing the network after a failure affects an original traffic route in the network, the method comprising the steps of:

determining, at first and second end nodes, that the failure along the original traffic route in the network has been repaired, the first and second end nodes being positioned along the original traffic route and along a restoration route in the network;

exchanging initiation messages between the first and second end nodes;

exchanging traffic signals between the first and second end nodes over both of the original and restoration routes in response to the initiation messages;

exchanging confirmation messages, at the first and second end nodes, in response to receipt of the traffic signals; and disconnecting the restoration route in response to the confirmation messages.

2. The method of claim 1 wherein the network fails to produce an alarm in response to repair of the failure, and wherein the step of determining includes the steps of:

initiating a timer; and when the timer expires, determining that the failure has been repaired if the first and second end nodes fail to receive the alarm.

3. The method of claim 1 wherein the step of exchanging initiation messages includes the steps of:

transmitting, from the first end node, a normalization message; and transmitting, from the second end node, an acknowledgment message in response to the normalization message.

4. The method of claim 1 wherein the first and second end nodes each have original and restoration ports coupled to the original and restoration routes, and wherein the step of exchanging traffic signals includes the steps of:

determining, at the first and second end nodes, that the traffic signals are being received at the original ports from the second and first end nodes, respectively; and switching to receiving and processing the traffic signals from the restoration ports to the original ports.

5. The method of claim 1 wherein the step of exchanging confirmation messages includes the steps of:

transmitting, from the first and second end nodes, confirmation messages to the second and first end nodes, respectively;

receiving, at the first and second end nodes, the confirmation message transmitted by the second and first end node, respectively; and ceasing to transmit the traffic signals over the restoration route.

6. The method of claim 1 wherein the step of disconnecting the restoration route includes the steps of:

transmitting, from the first and second end nodes, clear messages to nodes along the restoration route; and disconnecting the restoration route at the nodes along the restoration route in response to the clear messages.

7. The method of claim 1 wherein the step of exchanging traffic signals includes the steps of:

correlating, at at least the first end node, the traffic signals received over the original and restoration routes from the second end node; and switching to receiving and processing the traffic signals from the restoration route to the original route if the received traffic signals correlate.

8. In a network having a plurality of nodes interconnected by links, the network having a now repaired failure previously affecting an original communication route in the network, a computer implemented method comprising the steps of:

initiating network normalization at a selected node in the network after determining that the failure has been repaired, the selected node being positioned along at least the original communication route or along a restoration route in the network;

receiving confirmation signals confirming that traffic signals have been received over the original route at each end node of both the original and restoration routes; and disconnecting the restoration route in response to receiving the confirmation signals.

9. The method of claim 8 wherein the network fails to produce an alarm in response to repair of the failure, and wherein the step of initiating includes the steps of:

initiating a timer; and when the timer expires, determining that the failure has been repaired if the selected node fails to receive the alarm.

10. The method of claim 8, further comprising the step of determining, at the selected node, that the failure along the original route in the network has been repaired, the selected node being positioned at an end of at least a portion of both the original and restoration routes.

11. The method of claim 8 wherein the step of initiating includes the step of exchanging initiation messages between the selected node and another node, the another node being positioned along at least the original or restoration routes.

12. The method of claim 8 wherein the step of receiving signals confirmation includes the step of receiving a confirmation message at the selected node.

13. The method of claim 8 wherein the step of receiving signals confirmation includes the step of ceasing to transmit the traffic signals over the restoration route in response to receiving the traffic signals over both of the original and restoration routes.

14. The method of claim 8 wherein the step of disconnecting the restoration route includes the steps of:

transmitting a clear message to at least one node along the restoration route; and disconnecting the restoration route at the at least one node along the restoration route in response to the clear message.

15. A computer-readable medium containing instructions for a computer in a network, the network having a plurality of nodes interconnected by links, and having a now repaired failure previously affecting an original communication route in the network, the instructions of the computer-readable medium comprising the steps of:

initiating network normalization at a selected node in the network after determining that the failure has been repaired, the selected node being positioned along at least the original communication route or along a restoration route in the network;

receiving confirmation signals confirming that traffic signals have been received over the original route at each end node of both of the original and restoration routes; and disconnecting the restoration route in response to receiving the confirmation signals.

16. The computer-readable medium of claim 15 wherein the network fails to produce an alarm in response to repair of the failure, and wherein the step of initiating includes the steps of:

initiating a timer; and when the timer expires, determining that the failure has been repaired if the selected node fails to receive the alarm.

17. The computer-readable medium of claim 15, further comprising the step of determining, at the selected node, that the failure along the original route in the network has been repaired, the selected node being positioned at an end of at least a portion of both the original and restoration routes.

18. The computer-readable medium of claim 15 wherein the step of initiating includes the step of exchanging initiation messages between the selected node and another node, the another node being positioned along at least the original or restoration routes.

19. The computer-readable medium of claim 15 wherein the step of receiving confirmation signals includes the step of receiving a confirmation message at the selected node.

20. The computer-readable medium of claim 15 wherein the step of receiving confirmation signals includes the step of ceasing to transmit the traffic signals over the restoration route in response to receiving the traffic signals over both of the original and restoration routes.

21. The computer-readable medium of claim 15 wherein the step of disconnecting the restoration route includes the steps of:

transmitting a clear message to at least one node along the restoration route; and disconnecting the restoration route at the at least one node along the restoration route in response to the clear message.

22. In a network having a plurality of nodes interconnected by communication links, and having a now repaired failure previously affecting an original communication route in the network, an apparatus for normalizing the network comprising:

a computer program storage device; and a processor at a selected node in the network and coupled to the original route and to a restoration route in the network, and coupled to the program storage device, the processor performing instructions stored in the computer program storage device for (a) initiating network normalization after determining that the failure has been repaired, (b) receiving confirmation signals confirming that traffic signals have been received over the original route at each end node of both the original and restoration routes, and (c) disconnecting the restoration route in response to receiving the confirmation signals.

23. The apparatus of claim 22 wherein the network includes a plurality of restoration nodes, and wherein the apparatus includes a plurality of the processors at each of the restoration nodes.

24. The apparatus of claim 22 wherein the network fails to produce an alarm in response to repair of the failure, and wherein the processor initiates a timer, and when the timer expires, determines that the failure has been repaired if the processor fails to receive the alarm.

25. The apparatus of claim 22 wherein the processor determines that the failure along the original route in the network has been repaired, and wherein the selected node is positioned at an end of at least a portion of both the original and restoration routes.

26. The apparatus of claim 22 wherein the processor transmits an initiation message to another node, the another node being positioned along at least the original or restoration routes.

27. The apparatus of claim 22 wherein the processor receives a confirmation message from another node, the another node being positioned along at least the original or restoration routes.

28. The apparatus of claim 22 wherein the processor ceases transmitting the traffic signals over the restoration route in response to receiving the traffic signals over both of the original and restoration routes.

29. The apparatus of claim 22 wherein the processor transmits a clear message to at least one node along the restoration route.

* * * * *